US012294853B2

(12) United States Patent
Okimoto et al.

(10) Patent No.: US 12,294,853 B2
(45) Date of Patent: May 6, 2025

(54) SOUND PROCESSING DEVICE AND SOUND PROCESSING METHOD FOR FLEXIBLE REPRODUCTION OF SOUND

(71) Applicant: SONY GROUP CORPORATION, Tokyo (JP)

(72) Inventors: Koyuru Okimoto, Tokyo (JP); Toru Nakagawa, Tokyo (JP); Masashi Fujihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 178 days.

(21) Appl. No.: 17/906,106

(22) PCT Filed: Mar. 9, 2021

(86) PCT No.: PCT/JP2021/009235

§ 371 (c)(1),
(2) Date: Sep. 12, 2022

(87) PCT Pub. No.: WO2021/187229

PCT Pub. Date: Sep. 23, 2021

(65) Prior Publication Data

US 2023/0179946 A1 Jun. 8, 2023

(30) Foreign Application Priority Data

Mar. 18, 2020 (JP) ................................. 2020-047450

(51) Int. Cl.
*H04S 7/00* (2006.01)

(52) U.S. Cl.
CPC .............. *H04S 7/305* (2013.01); *H04S 7/301* (2013.01); *H04S 2420/01* (2013.01)

(58) Field of Classification Search
CPC ....... H04S 7/305; H04S 7/301; H04S 2420/01
See application file for complete search history.

(56) References Cited

U.S. PATENT DOCUMENTS 11,112,389 B1 * 9/2021 Robinson ................. G01H 7/00

FOREIGN PATENT DOCUMENTS

JP 2015-171111 A 9/2015
JP 2018-182757 A 11/2018

OTHER PUBLICATIONS

International Search Report and Written Opinion of PCT Application No. PCT/JP2021/009235, issued on May 11, 2021, 09 pages of ISRWO.

* cited by examiner

*Primary Examiner* — Andrew Sniezek
(74) *Attorney, Agent, or Firm* — CHIP LAW GROUP

(57) ABSTRACT

There is provided a sound processing device that includes an acquisition part that acquires parameters relating to a way of sounding of sound from first sound data obtained by actual measurement, an adjustment part that adjusts the parameters in accordance with a space for reproduction, a synthesis part that generates third sound data from second sound data on the basis of parameters having been adjusted by the adjustment part, and an output part that reproduces the third sound data.

9 Claims, 14 Drawing Sheets

FIG. 4
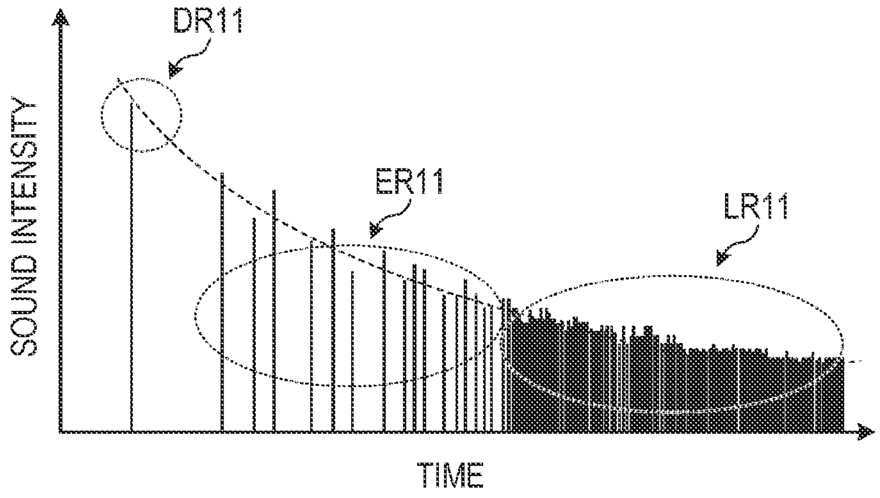
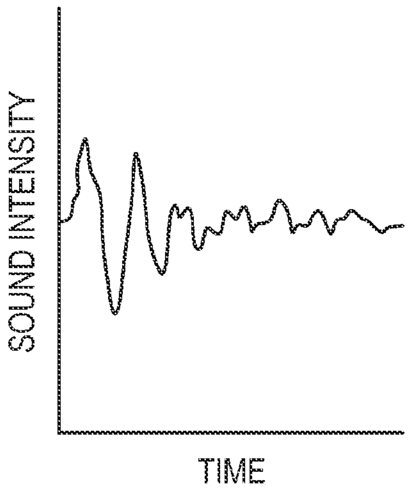
FIG. 5A
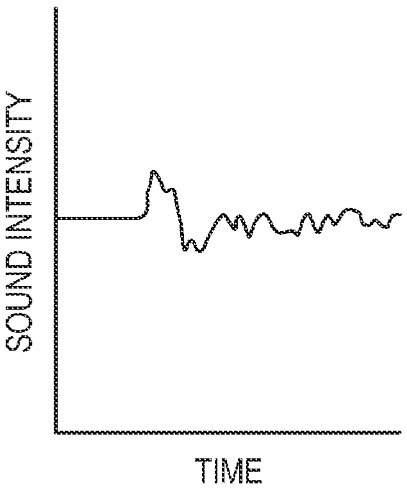
FIG. 5B

FIG. 9

121

| SOUND INFORMATION ID | SPACE ID | SOUND SOURCE ID | SOUND INFORMATION | | | | ... |
|---|---|---|---|---|---|---|---|
| | | | DIRECT SOUND | EARLY REFLECTIONS | LATE REVERBERATION | ... | ... |
| KR11 | RK11 | SP11 | DIRECT SOUND #1 | EARLY REFLECTIONS #1 | LATE REVERBERATION #1 | ... | ... |
| KR12 | RK11 | SP12 | DIRECT SOUND #2 | EARLY REFLECTIONS #2 | LATE REVERBERATION #2 | ... | ... |
| KR13 | RK11 | SP13 | DIRECT SOUND #3 | EARLY REFLECTIONS #3 | LATE REVERBERATION #3 | ... | ... |
| ... | ... | ... | ... | ... | ... | ... | ... |

FIG. 10

122

| LISTENER ID | SOUND INFORMATION | | ... |
|---|---|---|---|
| | LEFT EAR | RIGHT EAR | ... |
| U11 | SOUND INFORMATION LEFT #1 | SOUND INFORMATION RIGHT #1 | ... |
| U12 | SOUND INFORMATION LEFT #2 | SOUND INFORMATION RIGHT #2 | ... |
| U13 | SOUND INFORMATION LEFT #3 | SOUND INFORMATION RIGHT #3 | ... |
| ... | ... | ... | ... |

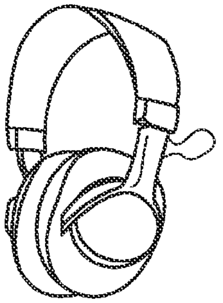
FIG. 14A
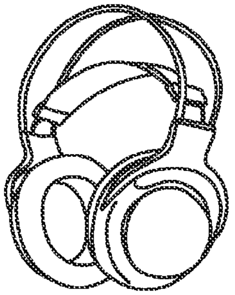
FIG. 14B
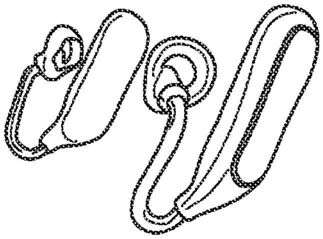
FIG. 14C
FIG. 15
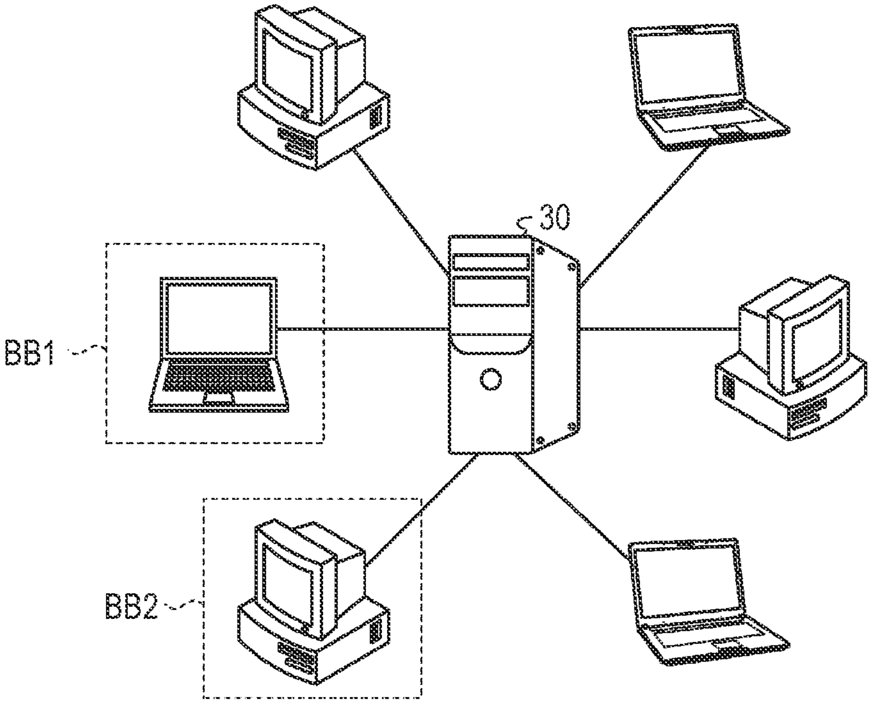

SOUND PROCESSING DEVICE AND SOUND PROCESSING METHOD FOR FLEXIBLE REPRODUCTION OF SOUND

CROSS REFERENCE TO RELATED APPLICATIONS

This application is a U.S. National Phase of International Patent Application No. PCT/JP2021/009235 filed on Mar. 9, 2021, which claims priority benefit of Japanese Patent Application No. JP 2020-047450 filed in the Japan Patent Office on Mar. 18, 2020. Each of the above-referenced applications is hereby incorporated herein by reference in its entirety.

TECHNICAL FIELD

The present disclosure relates to a sound processing device, a sound processing method, and a sound processing program.

BACKGROUND ART

In recent years, technology which stereophonically reproduces sound by a wearable device, such as headphones, which is operable to output sound by using a head related transfer function (HRTF) which mathematically represents a way of reaching of the sound to ears of a listener (user) who listens to the sound (audio) from a sound source has been attracting attention. In this technology, an HRTF acquired via a humanoid microphone which is referred to as a dummy head microphone is used, and the HRTF acquired by the dummy head microphone is converted to an HRTF which is unique to a listener, thereby allowing reproduction environment in accordance with each of listeners to be realized.

CITATION LIST

Patent Document

Patent Document 1: Japanese Patent Application Laid-Open No. 2015-171111

SUMMARY OF THE INVENTION

Problems to be Solved by the Invention

However, since in the above-described technology, a space (environment) which serves as reference for reproducing the sound is fixed, there may be a case where it is difficult to flexibly reproduce desired sound.

Therefore, in the present disclosure, a sound processing device, a sound processing method, and a sound processing program, which allow sound to be flexibly reproduced and are novel and improved, are proposed.

Solutions to Problems

According to the present disclosure, provided is a sound processing device including: an acquisition part that acquires parameters relating to a way of sounding of sound from first sound data, the first sound data being obtained by actual measurement; an adjustment part that adjusts the parameters in accordance with a space for reproduction; a synthesis part that generates third sound data from second sound data on the basis of parameters having been adjusted by the adjustment part; and an output part that reproduces the third sound data.

BRIEF DESCRIPTION OF DRAWINGS

FIG. 4 shows a graph showing one example of measurement data of sound information according to the embodiment.

FIGS. 5A and 5B show graphs showing one example of measurement data of sound information according to the embodiment.

FIG. 9 is a table showing one example of a sound information storage part according to the embodiment.

FIG. 10 is a table showing one example of a listener characteristic information storage part according to the embodiment.

FIGS. 14A, 14B, and 14C are diagrams showing one example of each terminal device according to the embodiment.

FIG. 15 is a diagram showing an outline of variation of processing according to the embodiment.

MODE FOR CARRYING OUT THE INVENTION

Hereinafter, with reference to the accompanying drawings, a preferable embodiment of the present disclosure will be described in detail. It is to be noted that in the present description and the drawings, components having the substantially same function configurations are denoted by the same reference signs, and overlapping description is thereby omitted.

It is to be noted that the description is given in the following order.

1. One Embodiment of the Present Disclosure
1.1. Outline
1.2. Configuration of Sound Processing System
2. Function of Sound Processing System
2.1. Outline of Function
2.2. Function Configuration Example
2.3. Processing of Sound Processing System
2.4. Variation of Processing
3. Hardware Configuration Example
4. Conclusion

1. One Embodiment of the Present Disclosure

<1.1. Outline>

In recent years, technology which stereophonically reproduces sound by a wearable device, such as headphones, which is operable to output sound by using a head related transfer function (HRTF) which mathematically represents a way of reaching of the sound to ears of a listener (user) who listens to the sound from a sound source has been attracting attention. In this technology, an HRTF acquired via a humanoid microphone which is referred to as a dummy head microphone is used, and the HRTF acquired by the dummy head microphone is converted to an HRTF which is unique to a listener, thereby allowing reproduction environment in accordance with each of listeners to be realized.

However, since in the above-described technology, a space which serves as reference for reproducing the sound is fixed, there may be a case where it is difficult to flexibly reproduce desired sound.

An idea of one embodiment of the present disclosure has been devised by focusing on the above-mentioned respects, and technology which allows the sound to be flexibly reproduced is proposed. Hereinafter, the present embodiment will be described in detail in order.

<1.2. Configuration of Sound Processing System>

Figure 1:
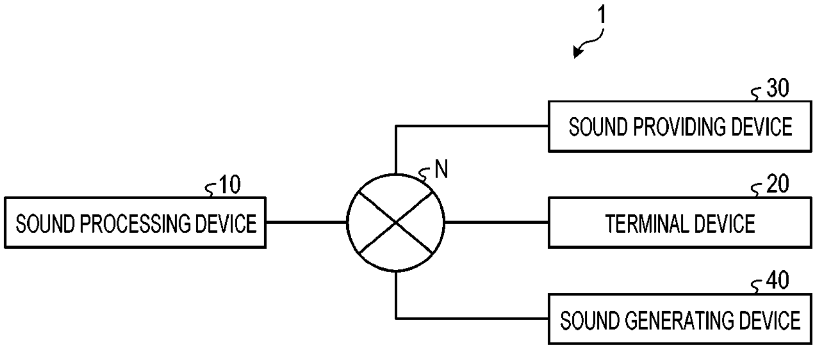
FIG. 1 is a diagram showing a configuration example of a sound processing system according to an embodiment.

First, a configuration of a sound processing system 1 according to an embodiment will be described. FIG. 1 is a diagram showing a configuration example of the sound processing system 1. As shown in FIG. 1, the sound processing system 1 includes a sound processing device 10, a terminal device 20, a sound providing device 30, and a sound generating device 40. Various devices can be connected to the sound processing device 10. For example, the terminal device 20 and the sound providing device 30 are connected to the sound processing device 10, and among the devices, linking of information is performed. The terminal device 20 and the sound providing device 30 are connected to the sound processing device 10 in a wireless manner. For example, the sound processing device 10 performs near-field wireless communication using Bluetooth (a registered trademark) with the terminal device 20 and the sound providing device 30. It is to be noted that the terminal device 20 and the sound providing device 30 may be connected to the sound processing device 10 in a wired manner or may be connected thereto via a network.

(1) Sound Processing Device 10

The sound processing device 10 is an information processing device which in accordance with a plurality of parameters relating to a way of sounding of sound, controls, for example, sound outputted by the terminal device 20. Specifically, the sound processing device 10 first acquires parameters relating to the way of sounding of sound in environment, which are measured from sound information (hereinafter, appropriately referred to as "first sound data") obtained by actual measurement in a predetermined space. It is to be noted that the parameters relating to the way of sounding of sound are direct sound, early reflections, late reverberation, characteristics of a listener, and the like. Then, on the basis of the acquired parameters, the sound processing device 10 performs processing for reproducing the measured sound information in other space which is different from the space in which the sound information is measured. Then, the sound processing device 10 provides the sound information, for which the processing for reproducing is performed, for the terminal device 20. It is to be noted that hereinafter, sound information before performing the processing for reproducing is appropriately referred to as "second sound data". Unlike the first sound data obtained by the actual measurement in the predetermined space, the second sound data is the former (original) sound information emitted from the sound source, which can be obtained in the other space which is different from the predetermined space. In addition, hereinafter, sound information after performing the processing for reproducing is appropriately referred to as "third sound data".

In addition, the sound processing device 10 also has a function to control the overall operation of the sound processing system 1. For example, on the basis of the information linked among the devices, the sound processing device 10 controls the overall operation of the sound processing system 1. Specifically, for example, on the basis of information received from the sound providing device 30, the sound processing device 10 controls sound outputted by the terminal device 20.

The sound processing device 10 is realized by a personal computer (PC), a work station (WS), or the like. It is to be noted that the sound processing device 10 is not limited to the PC, the WS, or the like. For example, the sound processing device 10 may be an information processing device such as a PC and a WS in which a function as the sound processing device 10 is implemented as an application.

(2) Terminal Device 20

The terminal device 20 is a wearable device, such as earphones and headphones, which is operable to output sound. It is to be noted that the terminal device 20 is not limited to the wearable device and as long as a device is operable to output sound, the terminal device 20 may be any device. For example, the terminal device 20 may be a loudspeaker.

On the basis of the sound information provided from the sound processing device 10, the terminal device 20 outputs the sound.

(3) Sound Providing Device 30

The sound providing device 30 is an information processing device which provides sound information for the sound processing device 10. For example, on the basis of information pertinent to acquisition of sound information, the sound providing device 30 provides the sound information.

The sound providing device 30 is realized by a PC, a WS, or the like. It is to be noted that the sound providing device 30 is not limited to the PC, the WS, or the like. For example, the sound providing device 30 may be an information processing device, such as a PC and a WS, in which a function as the sound providing device 30 is implemented as an application.

(4) Sound Generating Device 40

The sound generating device 40 is a measuring device which is operable to measure sound emitted from the sound source. A dummy head measuring device or the like, which is typified by, for example, head and torso simulators (HATS), corresponds to the sound generating device 40.

The sound generating device 40 provides the measured sound information.

2. Function of Sound Processing System

Hereinbefore, the configuration of the sound processing system 1 has been described. Subsequently, a function of the sound processing system 1 will be described.

<2.1 Outline of Function>

Figure 2:
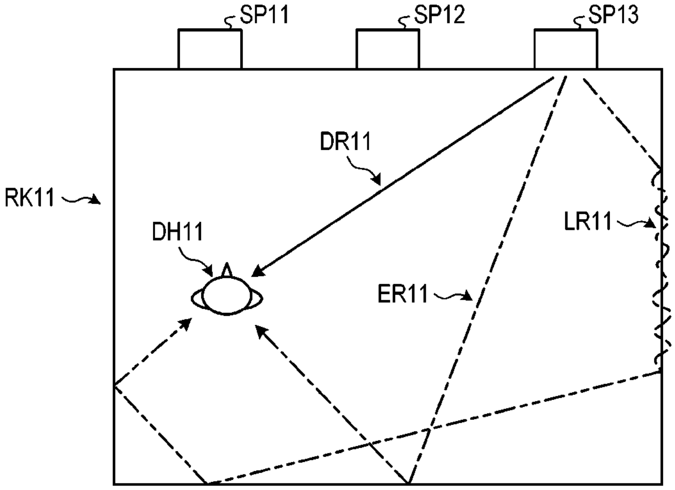
FIG. 2 is a diagram showing an outline of a function of the sound processing system according to the embodiment.

FIG. 2 is a diagram showing an outline of the plurality of parameters relating to the way of sounding of sound according to the embodiment. In FIG. 2, sound emitted from a sound source SP13 is measured via a plurality of paths, which are different from one another, by a measuring device DH11. The sound measured via the plurality of paths, which are different from one another, includes the direct sound, the early reflections, the late reverberation, and the like. Of the sound emitted from the sound source SP13, the direct sound (Direct Sound) DR11 is measured sound without being reflected by a space RK11. The direct sound DR11 is sound which influences sound quality. Of the sound emitted from the sound source SP13, the early reflections ER11 are measured sound while the number of times at which the early reflections ER11 are reflected by the space RK11 is less than a predetermined threshold value. Although in FIG. 2, a case where the early reflections ER11 are sound measured by the measuring device DH11 after the early reflections ER11 have been once reflected by the space RK11 is shown, the early reflections ER11 are not limited to the sound in this example. The early reflections ER11 are sound which influences perception of largeness of the space RK11. Of the sound emitted from the sound source SP13, the late reveberation LR11 is sound measured when the number of times at which the late reveberation LR11 is reflected by the space RK11 is the predetermined threshold value or more. The late reverberation LR11 is sound which influences lingering sound of the sound in the space RK11. It is to be noted that the early reflections ER11 and the late reverberation LR11 are sound influenced in accordance with a targeted space. For example, the early reflections ER11 and the late reverberation LR11 are influenced in accordance with largeness of the space RK11 or a raw material (material) of a wall thereof. It is to be noted that the raw material of the wall includes a raw material which absorbs sound, a raw material which amplifies sound, and the like. In addition, the raw material of the wall may be a raw material having a structure in which no reflection of sound is made as in an anechoic room.

Figure 3:
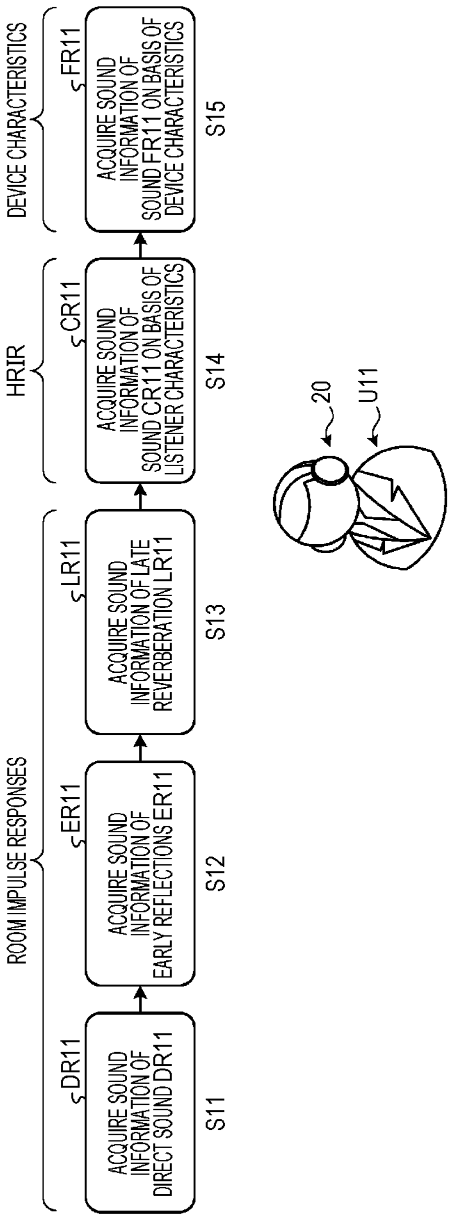
FIG. 3 is a diagram showing the outline of the function of the sound processing system according to the embodiment.

FIG. 3 is a diagram showing an outline of the function of the sound processing system 1 according to the embodiment. In FIG. 3, for example, by input of a signal for reproduction, the sound is emitted from the sound source. The sound processing system 1 first acquires sound information of the direct sound DR11 which is sound earliest measured by the measuring device DH11, of the sound emitted from the sound source (S11). Subsequently, the sound processing system 1 acquires sound information of the early reflections ER11 which are sound measured next to the direct sound DR11, of the sound emitted from the sound source (S12). Then, the sound processing system 1 acquires sound information of the late reverberation LR11 which is sound measured after the early reflections ER11, of the sound emitted from the sound source (S13). As described above, since time at which the direct sound DR11, the early reflections ER11, and the late reverberation LR11, which are measured by the measuring device DH11, reach the measuring device DH11 vary, there are time differences.

FIG. 4 is a graph showing one example of the sound information measured by the measuring device DH11. A vertical axis shown in FIG. 4 indicates sound intensity and a horizontal axis shown therein indicates time at which the sound is measured. The measuring device DH11 measures the sound in the order of the direct sound DR11, the early reflections ER11, and the late reverberation LR11. It is to be noted that the sound information of the direct sound DR11, the sound information of the early reflections ER11, and the sound information of the late reverberation LR11, which are measured by the measuring device DH11, are generally referred to as room impulse responses (RIR). In accordance with the time differences measured by the measuring device DH11, the measuring device DH11 can separately measure the direct sound DR11, the early reflections ER11, and the late reverberation LR11. Thus, the sound processing system 1 can separately control the sound information of the direct sound, the sound information of the early reflections, and the sound information of the late reverberation. In addition, not only in accordance with the time differences but also on the basis of a time interval of reflected sound, a magnitude of the reflected sound, and the like, the sound processing system 1 can also cut and divide the direct sound, the early reflections, and the late reverberation. Furthermore, the sound processing system 1 can also perform estimation from a state of a structural object in a measurement place and a sound speed and can further enhance accuracy by combining measurement results therewith.

The description returns back to the description of FIG. 3. The sound processing system 1 acquires sound information of sound CR11 based on characteristics of a listener U11 (S14). This sound CR11 is sound which influences a way of being listened of the sound which has reached a listener U11. Specifically, the sound CR11 is sound which influences a way of sounding of sound at auricles of ears of the listener U11. It is to be noted that the sound CR11 includes an HRTF of the listener.

FIGS. 5A and 5B show graphs showing one example of the sound information of the sound CR11. This sound information is referred to as a head related impulse response (HRIR) in which a head related transfer function HRTF is represented in a time domain. A vertical axis shown in FIGS. 5A and 5B show sound intensity and a horizontal axis shown therein shows time during which sound is transmitted through auricles. In FIG. 5A, an HRIR of a left ear of the listener U11 is shown, and in FIG. 5B, an HRIR of a right ear of the listener U11 is shown. It is to be noted that since the sound which reaches the left ear of the listener U11 and the sound which reaches the right ear thereof are different from each other, the HRIRs are different from each other between the left ear and the right ear of the listener U11.

By combining the sound information measured by the measuring device DH11 and the sound information based on the characteristics of the listener U11, the sound processing system 1 generates synthesized sound information. In other words, on the basis of the RIR and the HRIR, the sound processing system 1 synthesizes the pieces of sound information. Specifically, on the basis of synthesis of a waveform of the sound information measured by the measuring device DH11 and a waveform of the sound information based on the characteristics of the listener U11, the sound processing system 1 generates sound information which is a synthetic wave.

Figure 6B:
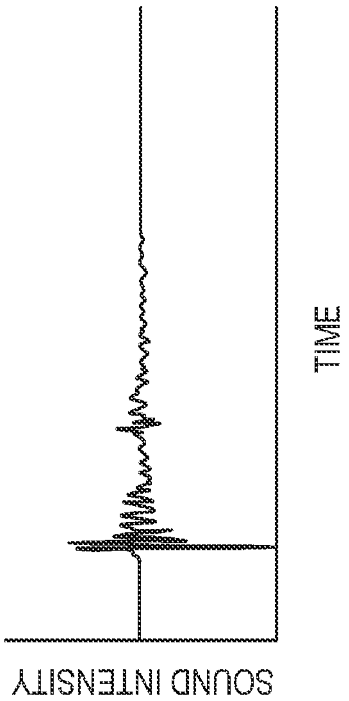
FIGS. 6A and 6B show a graph showing one example of measurement data of sound information according to the embodiment.
Figure 6A:
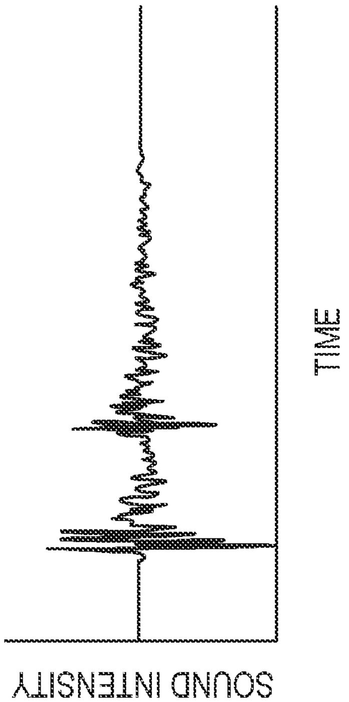

FIGS. 6A and 6B show graphs showing one example of the synthesized sound information. This sound information is referred to as a binaural room impulse response (BRIR). This sound information is sound information measured by a measuring device which is installed at real ears of the listener U11. A vertical axis shown in FIGS. 6A and 6B show sound intensity and a horizontal axis shown therein shows time which is required until the sound information is measured by the measuring device installed at the real ears of the listener U11. In FIG. 6A, a BRIR of the left ear of the listener U11 is shown, and in FIG. 6B, a BRIR of the right ear of the listener U11 is shown. As described above, on the basis of the RIR and the HRIR, the sound processing system 1 generates the BRIR.

It is to be noted that hereinafter, the BRIR which is the sound information in which the direct sound DR11, the early reflections ER11, the late reverberation LR11, and the sound CR11 are added is defined as sound field data and is appropriately discriminated from correction data based on characteristics of the later-described terminal device 20.

On the basis of the characteristics of the terminal device 20, the sound processing system 1 corrects the synthesized sound information (S15). For example, by combining the synthesized sound information and the sound information of the sound FR11 based on the characteristics of the terminal device 20, the sound processing system 1 corrects the sound information. Then, by providing the corrected sound information for the terminal device 20, the sound processing system 1 outputs the sound from the terminal device 20.

<2.2. Function Configuration Example>

Figure 7:
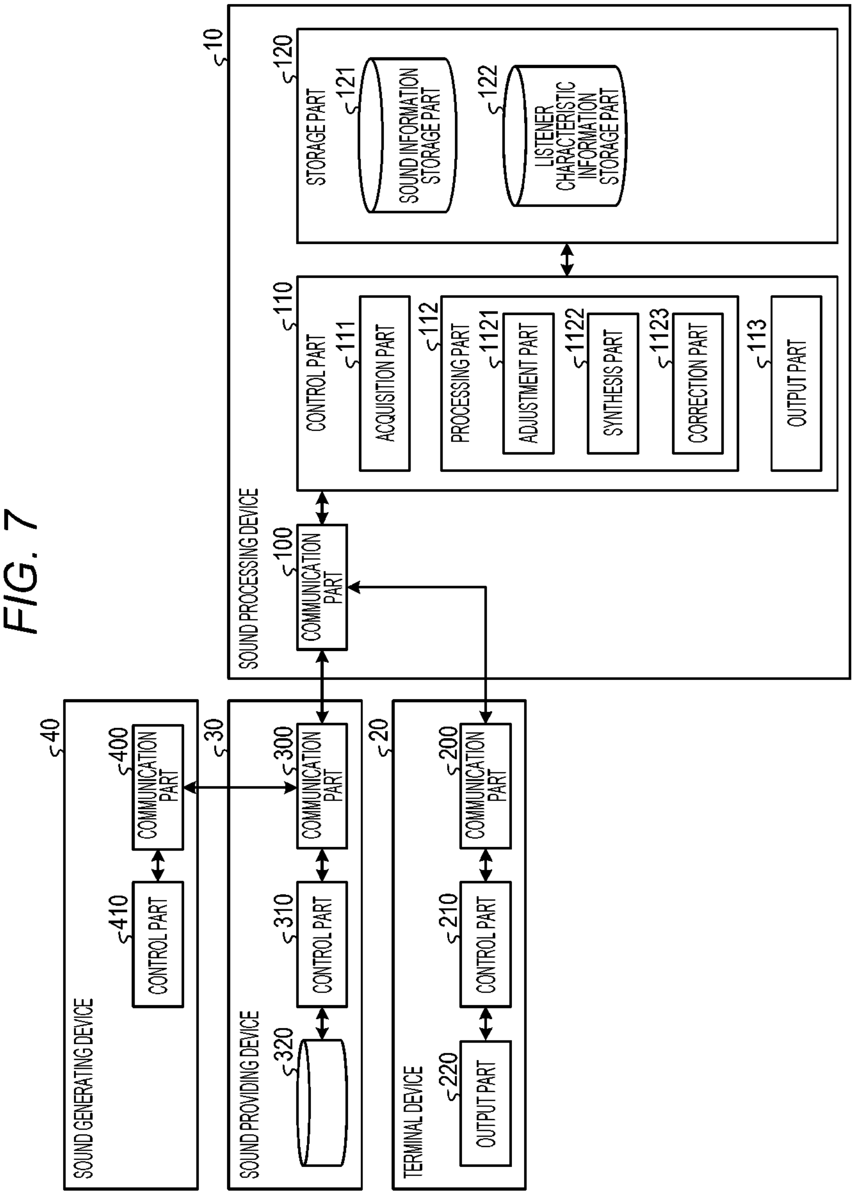
FIG. 7 is a block diagram showing a configuration example of the sound processing system according to the embodiment.

FIG. 7 is a block diagram showing a configuration example of the sound processing system 1 according to the embodiment.

(1) Sound Processing Device 10

As shown in FIG. 7, the sound processing device 10 includes a communication part 100, a control part 110, a storage part 120. It is to be noted that the sound processing device 10 has at least the control part 110.

(1-1) Communication Part 100

The communication part 100 has a function to communicate with an external device. For example, in the communication with the external device, the communication part 100 outputs information received from the external device to the control part 110. Specifically, the communication part 100 outputs information received from the sound providing device 30 to the control part 110. For example, the communication part 100 outputs the sound information to the control part 110.

In the communication with the external device, the communication part 100 transmits information inputted from the control part 110 to the external device. Specifically, the communication part 100 transmits information relating to acquisition of the sound information inputted from the control part 110 to the sound providing device 30.

(1-2) Control Part 110

The control part 110 has a function to control operation of the sound processing device 10. For example, the control part 110 acquires parameters relating to the way of sounding of sound. In addition, by adjusting the acquired parameters, the control part 110 performs processing for reproducing the sound.

In order to realize the above-described function, as shown in FIG. 7, the control part 110 has an acquisition part 111, a processing part 112, and an output part 113.

Acquisition Part 111

The acquisition part 111 has a function to acquire the parameters relating to the way of sounding of sound from the first sound data obtained by the actual measurement. The acquisition part 111 acquires the parameters transmitted from the sound providing device 30 via, for example, the communication part 100. As another example, the acquisition part 111 accesses the storage part 120 and acquires the parameters.

In addition, the acquisition part 111 acquires parameters of the direct sound DR from an initial amplitude in the first sound data. In addition, the acquisition part 111 acquires parameters of the early reflections ER from sound characteristics of a first section in the first sound data. In addition, the acquisition part 111 acquires parameters of the late reverberation LR from sound characteristics of a second section, subsequent to the first section, in the first sound data. In addition, the acquisition part 111 acquires parameters of the sound CR relating to the characteristics of the listener. For example, the acquisition part 111 acquires parameters including the HRTF of the listener.

Processing Part 112

The processing part 112 has a function to control processing of the sound processing device 10. As shown in FIG. 7, the processing part 112 has an adjustment part 1121, a synthesis part 1122, and a correction part 1123.

Adjustment Part 1121

Figure 8A:
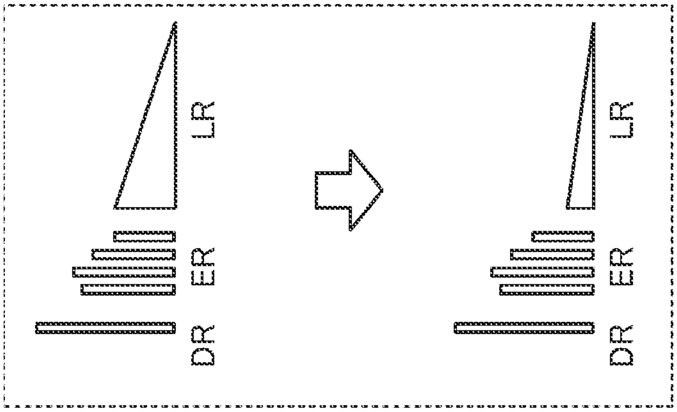
FIGS. 8A, 8B, and 8C are diagrams showing one example of measurement data of sound information according to the embodiment.
Figure 8B:
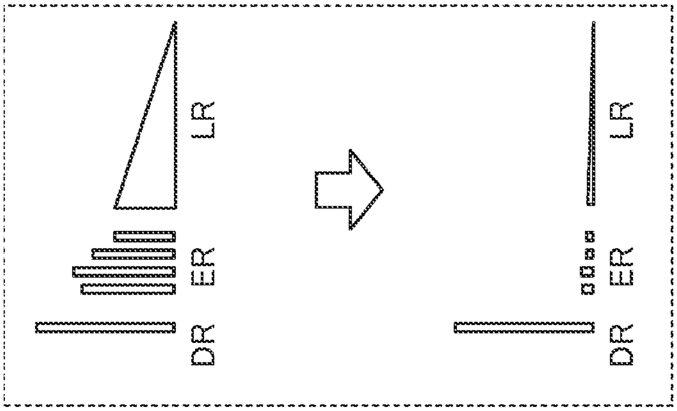
Figure 8C:
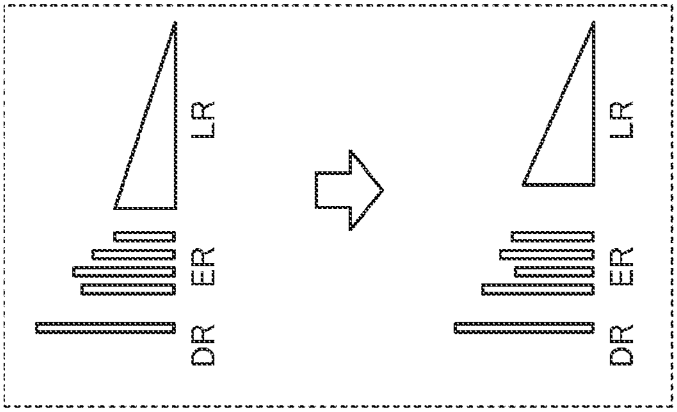

The adjustment part 1121 has a function to perform processing for adjusting the acquired parameters. The adjustment part 1121 adjusts the parameters in accordance with a space for reproduction. FIGS. 8A, 8B, and 8C show one example of the processing by the adjustment part 1121. In FIG. 8A, a case where the adjustment part 1121 performs processing in which only the late reverberation LR is uniformly attenuated is shown. Thus, while reproducing largeness equivalent to that of a reference space, the adjustment part 1121 can further clarify sound quality. In FIG. 8B, a case where the adjustment part 1121 performs processing in which the early reflections ER and the late reverberation LR are extremely lowered is shown. Thus, the adjustment part 1121 can reproduce sound of a sound source itself such as a loudspeaker. In FIG. 8C, a case where the adjustment part 1121 performs processing in which a frequency and an amplitude of each of the early reflections ER and the late reverberation LR are separately controlled is shown. Thus, while reproducing the largeness equivalent to that of the reference space, the adjustment part 1121 can reproduce, for example, a virtual space in which a sound absorption coefficient is changed, for example, by changing a raw material of a wall of a space and adding a sound absorbing material to the raw material of the wall.

It is to be noted that it is not required for the adjustment part 1121 to perform processing for controlling the sound for the direct sound DR as shown in FIGS. 8A, 8B, and 8C. Thus, the adjustment part 1121 can perform processing for reproducing sound for which characteristics of the sound source are reflected.

By comparing the reference space and a space targeted for reproduction of the sound, the adjustment part 1121 adjusts the parameters. For example, by comparing largeness of the reference space and largeness of the space targeted for reproduction of the sound, the adjustment part 1121 adjusts the parameters of the direct sound DR, the early reflections ER, and the late reverberation LR. As another example, by comparing a raw material of a wall of the reference space and a raw material of a wall of the space targeted for reproduction of the sound, the adjustment part 1121 adjusts the parameters of the direct sound DR, the early reflections ER, and the late reverberation LR.

In accordance with, for example, work contents of the sound and matters of concern of a provider of the sound (for example, a person who inputs signals for reproduction), the adjustment part 1121 adjusts the parameters. Thus, by switching the parameters in accordance with the work contents of the sound and the matters of concern of the provider, the adjustment part 1121 can easily perform switching of the space.

On the basis of actually measured parameters, the adjustment part 1121 adjusts parameters in accordance with the work contents of the sound and the matters of concern of the provider of the sound. Thus, the adjustment part 1121 can reproduce an imaginary space (virtual space) suited for the work of the sound at high accuracy.

Synthesis Part 1122

The synthesis part 1122 has a function to perform processing in which the sound information is synthesized. On the basis of the parameters adjusted by the adjustment part 1121, the synthesis part 1122 generates the third sound data from the second sound data. For example, on the basis of sound information in a predetermined space controlled for each of the parameters and the sound information based on the characteristics of the listener, the synthesis part 1122 synthesizes the sound information. Specifically, by synthesizing a waveform of the sound information in the predetermined space controlled for each of the parameters and a waveform of the sound information based on the characteristics of the listener, the synthesis part 1122 generates sound information which is of a synthetic wave. Thus, by adding characteristics unique to a listener and making conversion to the HRTF of each of listeners, the synthesis part 1122 can reproduce the sound at high accuracy, though in general, an HRTF acquired by a dummy head microphone is used.

Correction Part 1123

The correction part 1123 has a function to perform processing in which sound information in a device in which reproduction is performed is corrected. For example, the correction part 1123 corrects the third sound data. For example, on the basis of characteristics of the terminal device 20, the correction part 1123 corrects the sound information in the device in which the reproduction is performed. By combining, for example, the synthesized sound information and the sound information based on the characteristics of the terminal device 20, the correction part 1123 corrects the sound information. As another example, by applying characteristics inverse to the characteristics of the terminal device 20, the correction part 1123 corrects the sound information. In addition, the correction part 1123 may correct the sound information on the basis of characteristics of the output part 113.

Output Part 113

The output part 113 has a function to provide sound information for which processing of reproduction is performed. For example, the output part 113 provides corrected sound information for the terminal device 20. Thus, the terminal device 20 can output sound which a provider of sound, a listener, or the like desires. In addition, the output part 113 may reproduce the third sound data. In this case, the output part 113 may include a device, such as a loudspeaker, earphones, and headphones, which is operable to reproduce the third sound data of the sound.

(1-3) Storage Part 120

The storage part 120 is realized, for example, by a semiconductor memory device such as a RAM and a flash memory or a storage device such as a hard disk and an optical disk. The storage part 120 has a function to store data relating to processing in the sound processing device 10. As shown in FIG. 7, the storage part 120 has a sound information storage part 121 and a listener characteristic information storage part 122.

FIG. 9 shows one example of the sound information storage part 121. The sound information storage part 121 shown in FIG. 9 stores sound information. As shown in FIG. 9, the sound information storage part 121 may have items such as "a sound information ID", "a space ID", "a sound source ID", and "sound information". In addition, the "sound information" may further include items such as "direct sound", "early reflections", and "late reverberation".

The "sound information ID" shows identification information for identifying sound information. The "space ID" shows identification information for identifying a space. The "sound source ID" shows identification information for identifying a sound source which emits sound. The "sound information" shows "sound information". The "direct sound" shows sound information corresponding to the direct sound. Although in an example shown in FIG. 9, an example in which conceptual pieces of information such as "direct sound #1" and "direct sound #2" are stored in the "direct sound" is shown, in reality, measurement data of the direct sound is stored. For example, measurement data such as a combination of sound intensity of the direct sound and time is stored. The "early reflections" show sound information corresponding to the early reflections. Although in the example shown in FIG. 9, an example in which conceptual pieces of information such as "early reflections #1" and "early reflections #2" are stored in the "early reflections" is shown, in reality, measurement data of the early reflections is stored. For example, measurement data such as a combination of sound intensity of the early reflections and time is stored. Although in the example shown in FIG. 9, an example in which conceptual pieces of information such as "late reverberation #1" and "late reverberation #2" are stored in the "late reverberation", in reality, measurement data of the late reverberation is stored. For example, measurement data such as a combination of sound intensity of the late reverberation and time is stored.

FIG. 10 shows one example of the listener characteristic information storage part 122. The listener characteristic information storage part 122 shown in FIG. 10 stores sound information based on the characteristics of the listener. As shown in FIG. 10, the listener characteristic information storage part 122 may have items such as a "listener ID" and "sound information". In addition, the "sound information" may further include items such as a "left ear" and a "right ear".

The "listener ID" shows identification information for identifying a listener. The "sound information" shows sound information based on the characteristics of the listener. The "left ear" shows sound information based on characteristics of a left ear of the listener. Although in an example shown in FIG. 10, an example in which conceptual pieces of information such as "sound information left #1" and "sound information lef t #2" are stored in the "left ear" is shown, in reality, measurement data of sound information based on the characteristics of the left ear of the listener is stored. For example, measurement data such as a combination of sound intensity of sound information based on the characteristics of the left ear of the listener and time is stored. The "right ear" shows sound information based on characteristics of a right ear of the listener. Although in the example shown in FIG. 10, an example in which conceptual pieces of information such as "sound information right #1" and "sound information right #2" are stored in the "right ear", in reality, measurement data of sound information based on characteristics of the right ear of the listener is stored. For example, measurement data such as a combination of sound intensity of sound information based on the characteristics of the right ear of the listener and time is stored.

(2) Terminal Device 20

As shown in FIG. 7, the terminal device 20 has a communication part 200, a control part 210, and an output part 220.

(2-1) Communication Part 200

The communication part 200 has a function to communicate with an external device. For example, in communication with the external device, the communication part 200 outputs information received from the external device to the control part 210. Specifically, the communication part 200 outputs sound information received from the sound processing device 10 to the control part 210.

(2-2) Control Part 210

The control part 210 has a function to control the overall operation of the terminal device 20. For example, the control part 210 performs processing for controlling output of the sound.

(2-3) Output Part 220

The output part 220 has a function to output the sound. The output part 220 outputs the sound.

(3) Sound Providing Device 30

As shown in FIG. 7, the sound providing device 30 includes a communication part 300, a control part 310, and a storage part 320.

(3-1) Communication Part 300

The communication part 300 has a function to communicate with an external device. For example, in communication with the external device, the communication part 300 outputs information received from the external device to the control part 310. Specifically, the communication part 300 outputs information received from the sound generating device 40 to the control part 310. For example, the communication part 300 outputs sound information to the control part 310.

In communication with the external device, the communication part 300 transmits information inputted from the control part 310 to the external device. Specifically, the communication part 300 transmits information relating to acquisition of sound information, inputted from the control part 310, to the sound generating device 40.

(3-2) Control Part 310

The control part 310 has a function to control operation of the sound providing device 30. For example, the control part 310 acquires sound information transmitted via the communication part 300 from the sound generating device 40. For example, the control part 310 transmits the acquired sound information to the sound processing device 10. For example, the control part 310 accesses the storage part 320 and transmits the acquired sound information to the sound processing device 10.

(3-3) Storage Part 320

The storage part 320 stores information similar to the information which the storage part 120 stores. Therefore, description as to the storage part 320 is omitted.

(4) Sound Generating Device 40

As shown in FIG. 7, the sound generating device 40 includes a communication part 400 and a control part 410.

(4-1) Communication Part 400

The communication part 400 has a function to communicate with an external device. For example, in communication with the external device, the communication part 400 outputs information received from the external device to the control part 410. Specifically, the communication part 400 outputs information received from the sound providing device 30 to the control part 410. For example, the communication part 400 outputs information relating to acquisition of sound information to the control part 410.

In communication with the external device, the communication part 400 transmits information inputted from the control part 410 to the external device. Specifically, the communication part 400 transmits measured sound information to the sound providing device 30.

(4-2) Control Part 410

The control part 410 has a function to control operation of the sound generating device 40. For example, the control part 410 measures sound information of sound emitted from the sound source. For example, on the basis of the measured sound information, the control part 410 acquires sound information of each of the parameters. For example, the control part 410 transmits the acquired sound information to the sound providing device 30.

<2.3. Processing of Sound Processing System>

Hereinbefore, the function of the sound processing system 1 according to the embodiment has been described. Subsequently, processing of the sound processing system 1 will be described.

(1) Processing in Sound Generating Device 40

Figure 11:
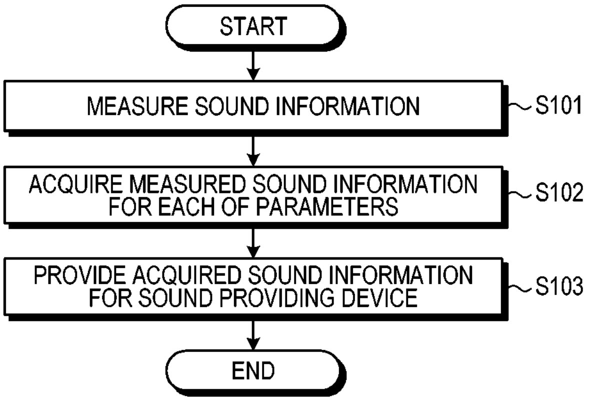
FIG. 11 is a flowchart showing a flow of processing in a sound generating device according to the embodiment.

FIG. 11 is a flowchart showing a flow of processing in the sound generating device 40 according to the embodiment. First, the sound generating device 40 measures sound information (S101). For example, the sound generating device 40 measures sound information of sound emitted from the sound source such as a loudspeaker. Subsequently, the sound generating device 40 acquires measured sound information for each of the parameters (S102). Then, the sound generating device 40 provides the acquired sound information for the sound providing device 30 (S103).

(2) Processing in Sound Processing Device 10

Figure 12:
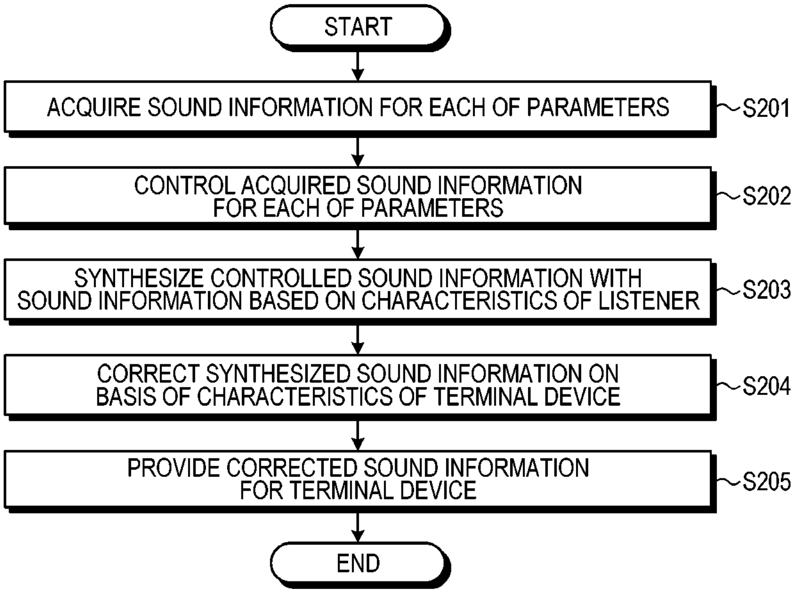
FIG. 12 is a flowchart showing a flow of processing in a sound processing device according to the embodiment.

FIG. 12 is a flowchart showing a flow of processing in the sound processing device 10 according to the embodiment. First, the sound processing device 10 acquires sound information for each of the parameters (S201). In addition, the sound processing device 10 controls the acquired sound information for each of the parameters (S202). For example, the sound processing device 10 performs processing in which sound information corresponding to the late reverberation is uniformly attenuated. As another example, the sound processing device 10 performs processing in which pieces of sound information, corresponding to the early reflections and the late reverberation, are extremely lowered. As further another example, the sound processing device 10 performs processing in which a frequency and an amplitude of each of the early reflections and the late reverberation are separately controlled. Subsequently, the sound processing device 10 performs processing in which the controlled sound information is synthesized with sound information based on the characteristics of the listener (S203). Subsequently, on the basis of the characteristics of the terminal device 20, the sound processing device 10 corrects the sound information for which the synthesis processing is performed (S204). Then, the sound processing device 10 provides the corrected sound information for the terminal device 20 (S205). Thus, the terminal device 20 can output desired sound to the listener.

<2.4. Variation of Processing>

Hereinbefore, the embodiment of the present disclosure has been described. Subsequently, variation of the processing in the embodiment of the present disclosure will be described. It is to be noted that the variation of the processing described hereinafter, may be singly applied to the embodiment of the present disclosure or may be applied to the embodiment of the present disclosure in combination. In addition, the variation of the processing may be applied, instead of the configuration described in the embodiment of the present disclosure or may be applied in addition to the configuration described in the embodiment of the present disclosure.

(1) Invalidation and Addition of Sound Source Characteristics

In the above-described embodiment, the case where the processing part 112 performs the processing in which the sound is controlled for the pieces of sound information of the early reflections ER and the late reverberation LR is shown. Thus, the processing part 112 can perform the processing for reproducing the sound for which the characteristics of the sound source are reflected. Here, the processing part 112 may perform processing in which the sound is controlled for the sound information of the direct sound DR. The processing part 112 may apply, for example, characteristics inverse to the characteristics of the sound source to the sound information of the direct sound DR. For example, the processing part 112 may synthesize the sound information of the direct sound DR with sound information corresponding to the characteristics inverse to the characteristics of the sound source so as to negate a waveform of the sound information of the direct sound DR. In other words, the processing part 112 applies an inverse filter to the sound information of the direct sound DR so as to negate the waveform of the sound information of the direct sound DR. At this time, the processing part 112 may apply the inverse filter with not only frequency information of the waveform but also, for example, phase information of the waveform included thereto. Thus, the processing part 112 can perform processing for reproducing sound for which the characteristics of the sound source is invalidated (cancelled). Thus, the processing part 112 can perform processing for reproducing sound for which a raw material of the sound itself is made easy-to-listen-to.

In addition, the processing part 112 invalidates the characteristics of the sound source and thereafter, the processing part 112 may apply characteristics of a desired sound source to the invalidated sound information. For example, the processing part 112 may synthesize the invalidated sound information with sound information corresponding to the characteristics of the desired sound source. It is to be noted that the processing part 112 may apply characteristics which include not only the frequency information of the waveform but also, for example, the phase information of the waveform. Thus, while reproducing largeness equivalent to the reference space, the processing part 112 can reproduce sound of a virtual sound source which is different from a sound source provided in a space. Thus, the processing part 112 can reproduce sound in combination which is not present in reality in a manner in which sound of a sound source not provided in a movie theater AA1 is reproduced in the movie theater AA1.

(2) Application of Combination of Sound Information

In the above-described embodiment, the case where in which the processing part 112 separately controls the direct sound DR, the early reflections ER, the late reverberation LR, and the sound CR based on the characteristics of the listener and thereby performs the processing for reproducing the desired sound information is shown. Here, by selecting sound information of sound field data, which is previously set in accordance with kinds of a space, the processing part 112 may perform the processing for reproducing desired sound information. The processing part 112 may previously set sound information in accordance with, for example, largeness, a use application, and the like of the space. For example, the processing part 112 may previously set sound information for a small-scale space for home mixing (for example, a small room); sound information for a middle-scale space for producing a television (TV) title (for example, a middle-sized theater); sound information for a large-scale space for producing blockbusters (for example, a large theater); and the like. Thus, by selecting the sound information of the sound field data, the sound processing device 10 can provide desired sound information. For example, in accordance with selection of a provider of sound, a listener, or the like, the sound processing device 10 can provide desired sound information.

Figure 13A:
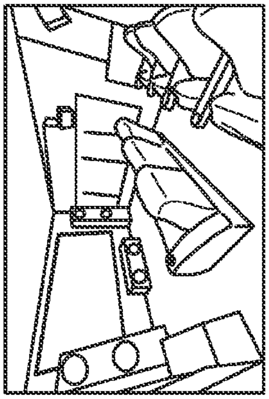
FIGS. 13A, 13B, and 13C are diagrams showing one example of reference spaces according to the embodiment.
Figure 13B:
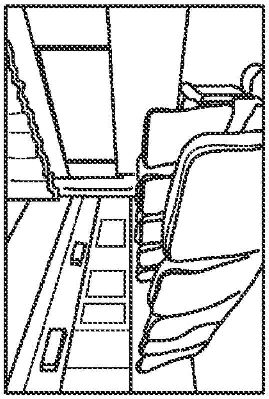
Figure 13C:
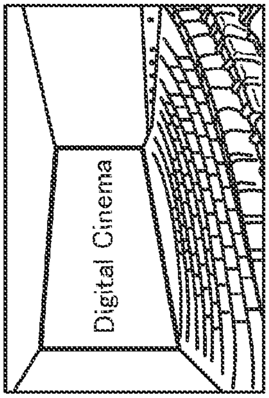

FIGS. 13A, 13B, and 13C show examples of kinds of the space. In of FIG. 13A, one example of the small room for home mixing is shown. In FIG. 13B, one example of the middle-sized theater for producing the television title is shown. In FIG. 13C, one example of the large theater for producing the blockbusters is shown. It is to be noted that the kinds of the space are not limited to these examples.

In addition, by selecting sound information of previously set correction data in accordance with kinds of the terminal device 20, the processing part 112 may perform processing for reproducing desired sound information. The processing part 112 may previously set sound information in accordance with, for example, a use application, a function, or the like of the terminal device 20. For example, the processing part 112 may previously set sound information for headphones for monitoring work; sound information for headphones with importance placed on wearability for long time work; sound information for open-type earphones in a scene in which communication among a plurality of people is required; and the like. Thus, by selecting the sound information of the correction data, the sound processing device 10 can provide desired sound information. For example, in accordance with selection of a provider of sound, a listener, or the like, the sound processing device 10 can provide desired sound information.

FIGS. 14A, 14B, and 14C show examples of kinds of the terminal device 20. In FIG. 14A, one example of the headphones for the monitoring work is shown. In FIG. 14B, one example of the headphones with importance placed on wearability for long time work is shown. In FIG. 14C, one example of the open-type earphones is shown. It is to be noted that the kinds of the terminal device 20 are not limited to these examples.

In addition, the sound processing device 10 separately sets sound field data and correction data of the terminal device 20 to be used and by freely combining sound information of the sound field data and sound information of the correction data, the sound processing device 10 can provide desired sound information.

(3) Storage of Sound Information

Although in the above-described embodiment, the case where the measured sound information is provided by the sound generating device 40 for the sound providing device 30 and the sound information linked to the combination of the space and the sound source is thereby stored is shown, the present disclosure is not limited to this example. The sound processing system 1 may store sound information linked to a creator (sound designer) of sound by the sound providing device 30. It is to be noted that the creator of the sound may be a provider of the sound. Thus, the sound processing system 1 can provide a scheme in which sound information required for work can be drawn out in any facility, for example, in a case where a creator works for sound for movie production or the like or other case. Thus, the sound processing system 1 can provide a scheme in which work can be performed in a virtual space which a creator invariably regards as an ideal space. In addition, as another example, the sound processing system 1 may store sound information linked to additional information of measurement data (for example, a measurement date, a measurer, a measurement place, measurement headphones, measurement data of all measuring devices, sections of the measurement data, delay information of measurement data, and image capturing information of the measurement data) by the sound providing device 30.

FIG. 15 shows one example of the above-described scheme. In FIG. 15, a case where the sound processing system 1 provides a scheme in which sound information produced in a movie company BB1 can be drawn out in a movie company BB2 via the sound providing device 30 is shown.

(4) Display of GUI

Figure 16:
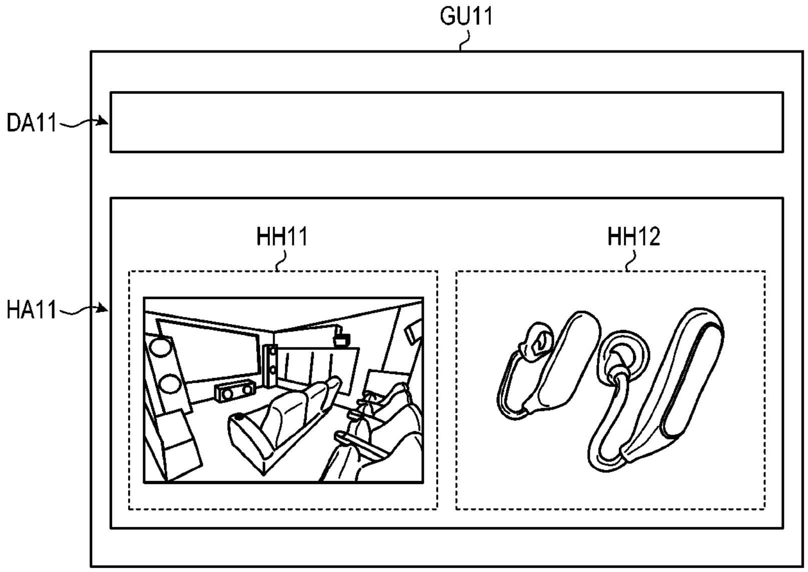
FIG. 16 is a diagram showing one example of a GUI according to the embodiment.

The sound processing system 1 may display the additional information of measurement data (for example, the measurement date, the measurer, the measurement place, the measurement headphones, the measurement data of all measuring devices, the sections of the measurement data, the delay information of the measurement data, the image capturing information of measurement data) and the like via a graphical user interface (GUI). FIG. 16 shows one example of the GUI. A region GU11 which is a display region of the GUI includes an input region DA11 which is a region where the measurement data is inputted and an input display region HA11 which is a region where information corresponding to the inputted measurement data is displayed. In addition, in the input display region HA11, information relating to a space and information relating to the terminal device 20 are displayed. For example, in the input display region HA11, image capturing information HH11 of the space and image capturing information HH12 of the terminal device 20 are displayed. Thus, the sound processing system 1 can effectively remind a target person who utilizes the GUI of contents of the measurement data.

(5) Layout Change of Space

Figure 17B:
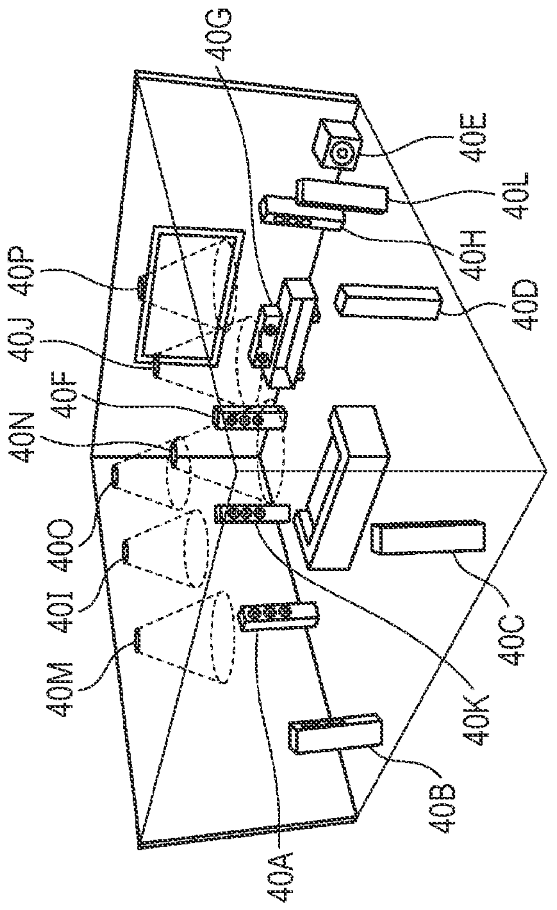
FIGS. 17A and 17B are diagrams showing an outline of variation of the processing according to the embodiment.
Figure 17A:
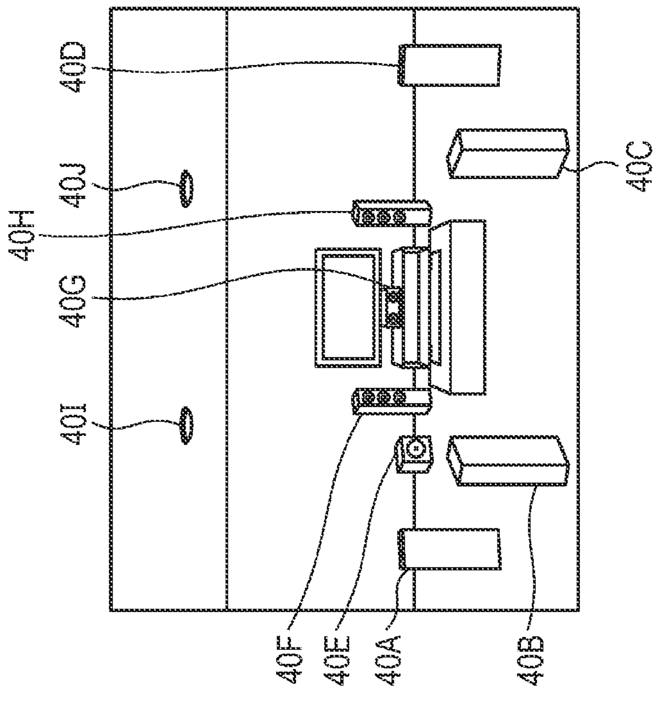

The sound processing system 1 may change a layout of a space where the sound is outputted, for example, by increasing the number of measuring devices in the space where the sound is measured. FIGS. 17A and 17B show one example of a layout change. In FIG. 17A, a space RK21 is shown. In the space RK21, ten measuring devices (a sound generating device 40A to a sound generating device 40J) are present. In FIG. 17B, a space RK22 is shown. In the space RK22, 16 measuring devices (a sound generating device 40A to a sound generating device 40P) are present. The sound processing system 1 may change the layout from the space RK21 to the space RK22. The sound processing system 1 may change the layout, for example, by increasing the number of measuring devices in the space, via operation based on, for example, interaural time difference (ITD), interaural level difference (ILD), or the like. Thus, for example, even in a case where a position of a sound source in the space RK21 is moved, the sound processing system 1 can reproduce sound equivalent to sound, which has been measures before the movement, in the space having the layout after the movement.

(6) Case where Early Reflections and Late Reverberation Cannot Be Measured

In the above-described embodiment, the case where the sound processing system 1 acquires the pieces of the sound information of the direct sound, the early reflections, and the late reverberation which are emitted from the same sound source and are measured via the different paths is shown. However, there may be a case where depending on a reference space, the early reflections and the late reverberation cannot be appropriately measured. The sound processing system 1 may measure the early reflections and the late reverberation via, for example, a head and torso simulator (HATS) and may measure the direct sound in other space. In this case, the sound processing system 1 may add the pieces of the sound information of the early reflections and late reverberation, which are measured via the HATS, and sound information of the direct sound and may thereby generate a data set of the pieces of the sound information. Thus, even in the case where in the reference space, the early reflections and the late reverberation cannot be measured, the sound processing system 1 can acquire the data set of the pieces of sound information of the direct sound, the early reflections, and the late reverberation as if the direct sound, the early reflections, and the late reverberation were measured in the reference space.

(7) Coping with Dynamic Motion of Listener

The sound processing system 1 may measure information relating to a facial motion of a listener by using a device which is operable to measure the facial motion of the listener (for example, a head band laser or a camera). For example, the sound processing system 1 may measure pieces of information of a face direction of the listener, a speed at which the listener moves his or her face, a range in which the listener moves his or her face, and the like. In addition, on the basis of the information relating to the facial motion of the listener, the sound processing system 1 may extract an optimum measurement spot of each listener. In addition, by using the extracted measurement spot, the sound processing system 1 may perform tracking (head tracking). Thus, the sound processing system 1 can perform optimum tracking for each listener. Thus, since the sound processing system 1 can consider a way of viewing each listener, the sound processing system 1 can perform measurement at a front face suited for each listener.

Figure 18A:
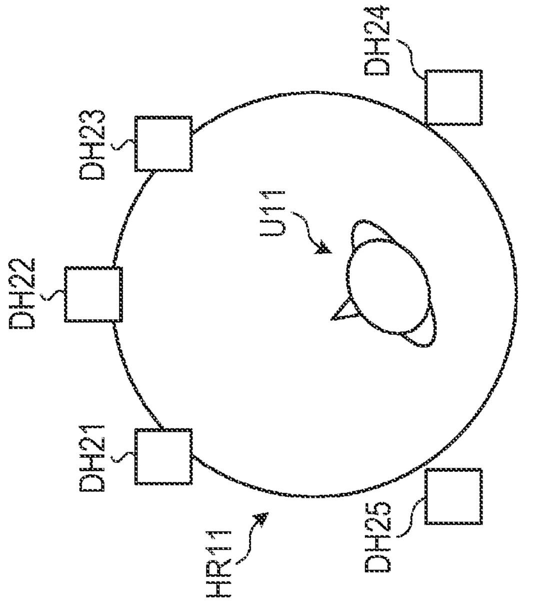
FIGS. 18A, 18B, 18C, and 18D are diagrams showing an outline of variation of the processing according to the embodiment.
Figure 18B:
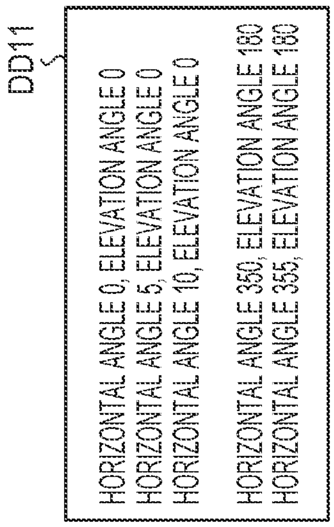

In FIG. 18A, one example of a way of sound listening in a case where the conventional tracking is performed is shown. In FIG. 18A, an HRTF of a whole circumference HR11 which includes a measuring device DH21 to a measuring device DH25 installed at equal distances from a listener U11 is stored as, for example, one measurement data. In FIG. 18B, one example of the measurement data in which the HRTF of the whole circumference HR11 is stored is shown. In this case, the HRTF actually measured by each of the measuring devices, which is installed in each target position, is acquired from measurement data DD11 in which the HRTFs of the whole circumference HR11 are stored. In this measurement data DD11, an HRTF based on characteristics of each target position is stored, instead of the HRTF of each target measuring device. Therefore, individual difference among the measuring devices cannot be appropriately reflected. In the conventional tracking, since sound outputted from sound sources at equal distances is measured, a space where the sound is measured can be different from a space where the sound is reproduced. Therefore, reflection and reverberation characteristics of the space cannot be appropriately reflected.

Figure 18C:
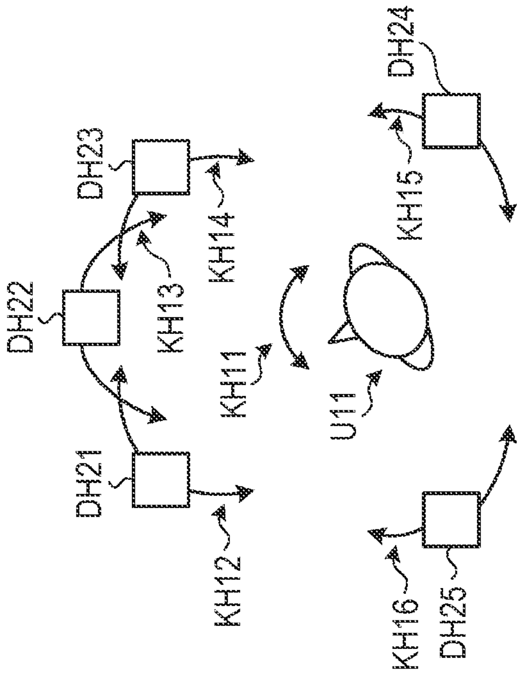

In FIG. 18C, one example of a way of sound listening in a case where optimum tracking for each listener is performed is shown. A range KH11 shows a range in which a listener U11 is tracked. A range KH12 to a range KH16 show ranges of measuring devices coping with the range KH11 where the listener U11 is tracked. Therefore, for example, when the listener U11 moves his or her face, the range KH12 to the range KH16 also change, coping with the movement.

Figure 18D:
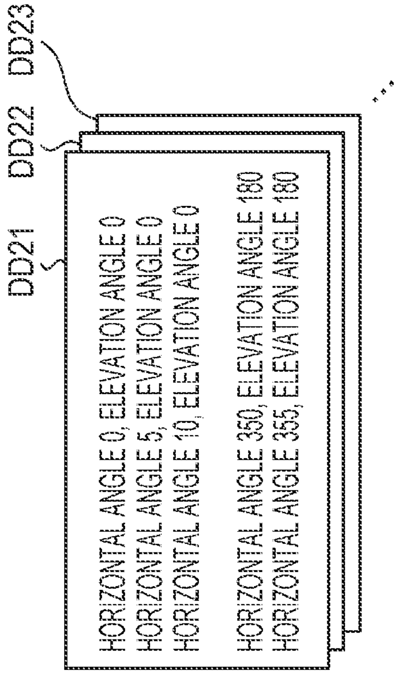

In FIG. 18D, one example of measurement data of each of the measuring devices, which copes with FIG. 18C, is shown. For example, measurement data DD21 is measurement data of a measuring device DH21. In the measurement data, each corresponding HRTF is stored for each of the measuring devices is stored. In this case, HRTFs based on each target position and characteristics of each of the measuring devices are acquired from the measurement data stored for each of the measuring device. Therefore, unlike the case where the conventional tracking is performed, the individual difference among the measuring devices can be appropriately reflected. In addition, unlike the case where the conventional tracking is performed, the reflection and reverberation characteristics of the space can be appropriately reflected.

3. Hardware Configuration Example

Figure 19:
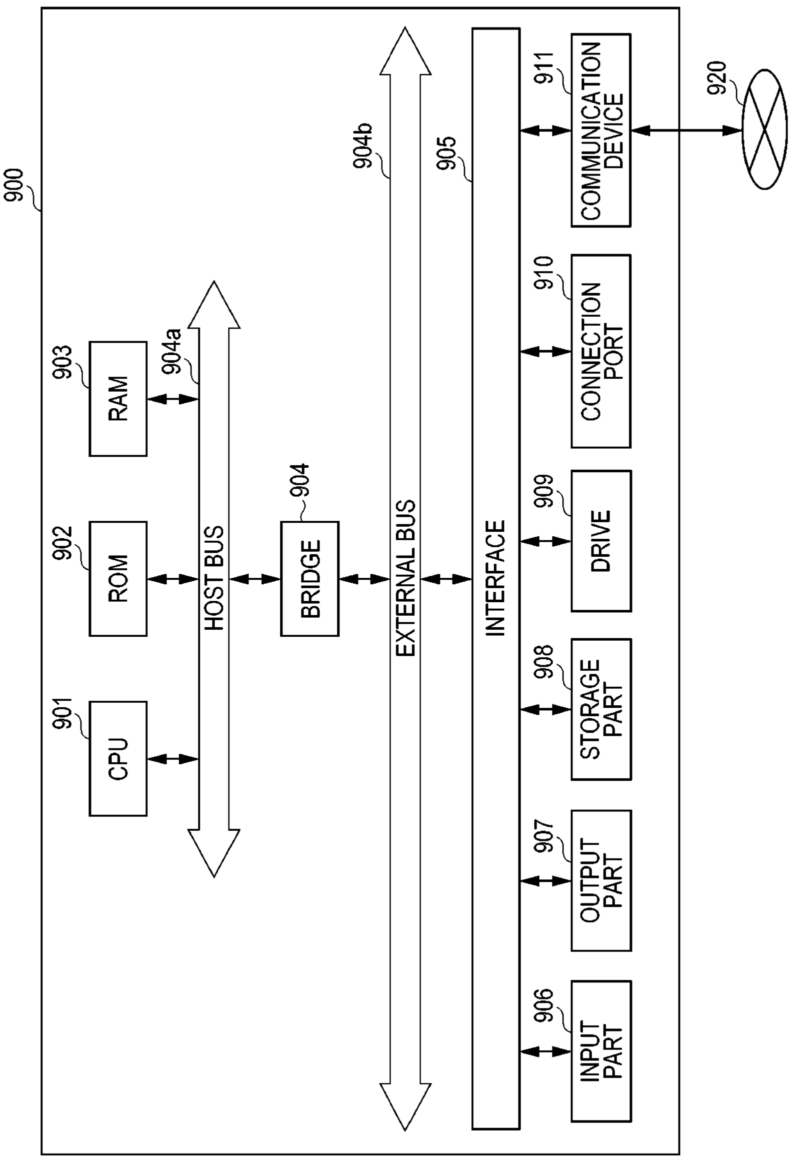
FIG. 19 is a hardware configuration diagram showing one example of a computer which realizes a function of the sound processing device.

Finally, with reference to FIG. 19, a hardware configuration example of the sound processing device according to the embodiment will be described. FIG. 19 is a block diagram showing the hardware configuration example of the sound processing device according to the embodiment. It is to be noted that the sound processing device 900 shown in FIG. 19 can realize, for example, the sound processing device 10, the terminal device 20, the sound providing device 30, and the sound generating device 40 which are shown in FIG. 7. Information processing by the sound processing device 10, the terminal device 20, the sound providing device 30, and the sound generating device 40 according to the embodiment is realized by collaboration of hardware described hereinafter and software.

As shown in FIGS. 18A, 18B, 18C, and 18D, the sound processing device 900 includes a central processing unit (CPU) 901, a read only memory (ROM) 902, and a random access memory (RAM) 903. In addition, the sound processing device 900 includes a host bus 904*a*, a bridge 904, an external bus 904*b*, an interface 905, an input device 906, an output device 907, a storage device 908, a drive 909, a connection port 910, and a communication device 911. It is to be noted that the hardware configuration shown here is one example and a part of components in the configuration may be omitted. In addition, the hardware configuration may further include components other than the components in the configuration shown here.

The CPU 901 functions as, for example, an arithmetic processing device or a control device and on the basis of various programs recorded in the ROM 902, the RAM 903, or the storage device 908, controls the overall operation of the components or a part thereof. The ROM 902 is means in which the programs read into the CPU 901, data used for computing, and the like are stored. The RAM 903 temporarily or permanently stores, for example, the programs read into the CPU 901, various parameters which appropriately vary upon executing the programs. These are mutually connected to the host bus 904*a* configured by a CPU bus or the like. The CPU 901, the ROM 902, and the RAM 903 can realize functions of the control part 110, the control part 210, the control part 310, and the control part 410, which are described with reference to FIG. 7, for example, by the collaboration with the software.

The CPU 901, the ROM 902, and the RAM 903 are mutually connected via, for example, the host bus 904*a* which is operable to transmit data at a high speed. On the other hand, the host bus 904*a* is connected to the external bus 904*b*, whose data transmission speed is low, for example, via the bridge 904. In addition, the external bus 904*b* is connected to various components via the interface 905.

The input device 906 is realized by devices which are, for example, a mouse, a keyboard, a touch panel, buttons, a microphone, switches, a lever, and the like and into which information is inputted by a listener. In addition, the input device 906 may be a remote control device which utilizes, for example, infrared rays or other electric waves or may be an external connection device, such as a mobile phone and a PDA, which copes with operation of the sound processing device 900. Furthermore, the input device 906 may include, for example, input control circuitry, which generates an input signal on the basis of information inputted by using the above-mentioned input means and outputs the input signal to the CPU 901, and the like. By operating this input device 906, an administrator of the sound processing device 900 can input various pieces of data to the sound processing device 900 and can issue an instruction to perform processing operation thereto.

Besides, the input device 906 can be formed by a device which detects sound. For example, the input device 906 can include various sensors such as an image sensor (for example, a camera), a depth sensor (for example, a stereo camera), an acceleration sensor, a gyroscope sensor, a geomagnetic sensor, an optical sensor, a sound sensor, a distance measuring sensor (for example, a time of flight (ToF) sensor, and a force sensor. In addition, the input device 906 may acquire information relating to a state of the sound processing device 900 itself such as a posture and a moving speed of the sound processing device 900 and information relating to a peripheral space of the sound processing device 900 such as brightness and noise around the sound processing device 900. In addition, the input device 906 may include a GNSS module which receives a GNSS signal (for example, a GPS signal from a global positioning system (GPS) satellite) from a global navigation satellite system (GNSS) satellite and measures positional information including a latitude, a longitude, and an altitude of the device. In addition, as the positional information, the input device 906 may be a device which detects a position by transmission and reception to and from Wi-Fi (a registered trademark), a mobile phone, a PHS, a smartphone, and the like, near-field communication, or the like. The input device 906 can realize a function of, for example, the control part 410 described with reference to FIG. 7.

The output device 907 is formed by a device which is operable to notify a listener of the acquired information in a visual or auditory manner. As such a device, there are a display device such as a CRT display device, a liquid crystal display device, a plasma display device, an EL display device, a laser projector, an LED projector, and a lamp, a sound output device such as a loudspeaker and headphones, a printer device, and the like. The output device 907 outputs results obtained by various kinds of processing which for example, the sound processing device 900 has performed. Specifically, the display device displays the results obtained by various kinds of processing which the sound processing device 900 has performed in a visual manner in various forms such as text, images, tables, and graphs. On the other hand, the sound output device converts an audio signal constituted of reproduced sound data, voice data, and the like to an analog signal and outputs in an auditory manner. The output device 907 can realize a function of, for example, the output part 220 described with reference to FIG. 7.

The storage device 908 is a device for storing data, which is formed as one example of the storage part of the sound processing device 900. The storage device 908 is realized by, for example, a magnetic storage part device such as an HDD, a semiconductor storage device, an optical storage device, a magneto optical storage device, or the like. The storage device 908 may include a storage medium, a recording device which records data in the storage medium, a reading device which reads the data from the storage medium, a deletion device which deletes the data recorded in the storage medium, and the like. This storage device 908 stores the programs executed by the CPU 901, various kinds of data, various kinds of data acquired from outside, and the like. The storage device 908 can realize a function, for example, the storage part 120 described with reference to FIG. 7.

The drive 909 is a reader/writer for a storage medium and is built in the sound processing device 900 or is externally mounted. The drive 909 reads information recorded in a removable storage medium such as an attached magnetic disk, optical disk, magnetooptical disk, or a semiconductor memory and outputs the information to the RAM 903. In addition, the drive 909 can also write the information in the removable storage medium.

The connection port 910 is a port for connecting, for example, an external connection device such as a universal serial bus (USB) port, an IEEE 1394 port, a small computer system interface (SCSI), an RS-232C port, or an optical audio terminal.

The communication device 911 is a communication interface formed by a communication device or the like for connecting to, for example, a network 920. The communication device 911 is a communication card for, for example, a wired or wireless local area network (LAN), Long Term Evolution (LTE), Bluetooth (a registered trademark), or a wireless USB (WUSB). In addition, the communication device 911 may be a router for optical communication, a router for an asymmetric digital subscriber line (ADSL), or a modem for various kinds of communication. This communication device 911 can transmit and receive signals or the like to and from, for example, the Internet or other communication device in conformity with, for example, a predetermined protocol such as TCP/IP. The communication device 911 can realize functions of, for example, the communication part 100, the communication part 200, the communication part 300, and the communication part 400, which are described with reference to FIG. 7.

It is to be noted that the network 920 is a wired or wireless transmission path through which information transmitted from a device connected to the network 920 is transmitted. For example, the network 920 may include a public line network such as the Internet, a telephone line network, and a satellite communication network, each of various local area networks (LANs) including Ethernet (a registered trademark), a wide area network (WAN), or the like. In addition, the network 920 may include a dedicated line network such as an Internet protocol-virtual private network (IP-VPN).

Hereinbefore, one example of the hardware configuration which can realize the function of the sound processing device 900 according to the embodiment is shown. The above-described components may be realized by using general-purpose members or may be realized by hardware dedicated to the functions of the components. Accordingly, in accordance with a technology level at time when the embodiment is implemented, a hardware configuration to be utilized can be appropriately changed.

4. Conclusion

As described above, on the basis of the sound information acquired for each of the parameters, the sound processing device 10 according to the embodiment performs processing for reproducing the measured sound information in other space which is different from the space in which the sound information is measured. Thus, the sound processing device 10 can flexibly reproduce the desired sound.

In addition, according to the above-described embodiment, the listener wearing the terminal device 20 separately controls the direct sound DR, the early reflections ER, and the late reverberation LR, thereby allowing the listener to enjoy sound experiences in a desired sound space. Furthermore, the sound CR based on the characteristics of the listener and the sound FR based on the characteristics of the terminal device 20 are independently controlled, and thus, in a state in which the former is optimized for each of the listeners and in a state in which the latter is optimized to the characteristics of the terminal device 20 worn by the listener, the listener can enjoy sound experiences having realistic feeling.

Hence, a sound processing device, a sound processing method, and a sound processing program, which allow sound to be flexibly reproduced and are novel and improved can be provided.

Hereinbefore, although with reference to the accompanying drawings, the preferred embodiment of the present disclosure has been described in detail, the technical scope of the present disclosure is not limited to the above-described embodiment. It is apparent to a person with ordinary skill in the technical field to which the present disclosure pertains to be able to arrive at various kinds of modification examples and correction examples without departing from the spirit and scope of technical ideas set forth in the appended claims, and it should be naturally understood that these modification examples and correction examples belong to the technical scope of the present disclosure.

For example, the devices described in the present description may be realized as a single device or one part or all parts thereof may be realized as separate devices. For example, each of the sound processing device 10, the terminal device 20, the sound providing device 30, and the sound generating device 40, which are shown in FIG. 7, may be realized as a single device. In addition, the sound processing device 10, the terminal device 20, the sound providing device 30, and the sound generating device 40 may be realized, for example, as a server device which are connected to the sound processing device 10, the terminal device 20, the sound providing device 30, and the sound generating device 40 via a network or the like. In addition, a server device connected via a network or the like may have the function of the control part 110 which the sound processing device 10 has.

In addition, a series of processing performed by each of the devices described in the present description may be realized by using any of software, hardware, and a combination of the software and the hardware. Programs constituting the software are previously stored in, for example, recording media (non-transitory media) provided inside or outside the devices. Then, each of the programs is read into the RAM, for example, upon execution by a computer and is executed by a processor such as the CPU.

In addition, it is not necessarily required to execute the processing described by using each of the flowcharts in the present description in the order shown in each of the drawings. Some of the processing steps may be executed in parallel. In addition, additional processing steps may be adopted, or a part of the processing steps may be omitted.

In addition, effects described in the present description are merely descriptive or illustrative but not restrictive. In other words, together with the above-mentioned effects or instead of the above-mentioned effects, the technology according to the present disclosure can exhibit other effects which are apparent to those skilled in the art from the description in the present description.

REFERENCE SIGNS LIST

- 1 Sound processing system
- 10 Sound processing device
- 20 Terminal device
- 30 Sound providing device
- 40 Sound generating device
- 100 Communication part
- 110 Control part
- 111 Acquisition part
- 112 Processing part
- 1121 Adjustment part
- 1122 Synthesis part
- 1123 Correction part
- 113 Output part
- 120 Storage part
- 200 Communication part
- 210 Control part
- 220 Output part
- 300 Communication part
- 310 Control part
- 320 Storage part
- 400 Communication part
- 410 Control part

The invention claimed is:

1. A sound processing device, comprising:

circuitry configured to:

obtain a head related transfer function of a user;

obtain first sound data based on actual measurement of sound in a first space;

acquire a plurality of parameters from the obtained first sound data, wherein the plurality of parameters is associated with specific characteristics of the sound;

generate first sound information by synthesis of the plurality of parameters and the head related transfer function of the user;

generate second sound information based on the first sound information and characteristics of a terminal device connected to the sound processing device;

acquire second sound data in a second space;

generate third sound data based on the second sound data and the second sound information; and output the third sound data.

2. The sound processing device according to claim 1, wherein the specific characteristics include first sound characteristics and second sound characteristics, the first sound characteristics correspond to a first section in the first sound data, the second sound characteristics correspond to a second section in the first sound data, the circuitry is further configured to:

acquire first parameters of the plurality of parameters from the first sound characteristics; and acquire second parameters of the plurality of parameters from the second sound characteristics, and the second section is subsequent to the first section in the first sound data.

3. The sound processing device according to claim 2, wherein the first parameters are related to early reflections of the sound, and the second parameters are related to late reverberation of the sound.

4. The sound processing device according to claim 2, wherein the circuitry is further configured to acquire third parameters of the plurality of parameters from an initial amplitude in the first sound data.

5. The sound processing device according to claim 4, wherein the third parameters are related to a sound source.

6. The sound processing device according to claim 4, wherein the circuitry is further configured to independently control the first parameters, the second parameters, and the third parameters.

7. The sound processing device according to claim 1, wherein the terminal device includes at least one of a loudspeaker, earphones, or headphones.

8. A sound processing method, comprising:

in a sound processing device:

obtaining a head related transfer function of a user;

obtaining first sound data based on actual measurement of sound in a first space;

acquiring a plurality of parameters from the obtained first sound data, wherein the plurality of parameters is associated with specific characteristics of the sound;

generating first sound information by synthesizing the plurality of parameters and the head related transfer function of the user;

generating second sound information based on the first sound information and characteristics of a terminal device connected to the sound processing device;

acquiring second sound data in a second space;

generating third sound data based on the second sound data and the second sound information; and outputting the third sound data.

9. A non-transitory computer-readable medium having stored thereon computer-executable instructions which, when executed by a processor of a sound processing device, cause the processor to execute operations, the operations comprising:

obtaining a head related transfer function of a user;

obtaining first sound data based on actual measurement of sound in a first space;

acquiring a plurality of parameters from the obtained first sound data, wherein the plurality of parameters is associated with specific characteristics of the sound;

generating first sound information by synthesizing the plurality of parameters and the head related transfer function of the user;

generating second sound information based on the first sound information and characteristics of a terminal device connected to the sound processing device;

acquiring second sound data in a second space;

generating third sound data based on the second sound data and the second sound information; and outputting the third sound data.

* * * * *